March 30, 1965 B. J. WARMAN 3,176,078

AUTOMATIC TELECOMMUNICATION SWITCHING SYSTEMS

Filed Dec. 28, 1959 2 Sheets-Sheet 1

INVENTOR
BLOOMFIELD JAMES WARMAN

BY Lawson and Taylor

March 30, 1965 B. J. WARMAN 3,176,078

AUTOMATIC TELECOMMUNICATION SWITCHING SYSTEMS

Filed Dec. 28, 1959 2 Sheets-Sheet 2

INVENTOR
BLOOMFIELD JAMES WARMAN

BY Larson and Taylor 3,176,078

AUTOMATIC TELECOMMUNICATION SWITCHING SYSTEMS

Bloomfield James Warman, Charlton, London, England, assignor to Associated Electrical Industries Limited, London, England, a company of Great Britain Filed Dec. 28, 1959, Ser. No. 862,263
Claims priority, application Great Britain, Jan. 1, 1959, 100/59
11 Claims. (Cl. 179—18)

Figure 1:
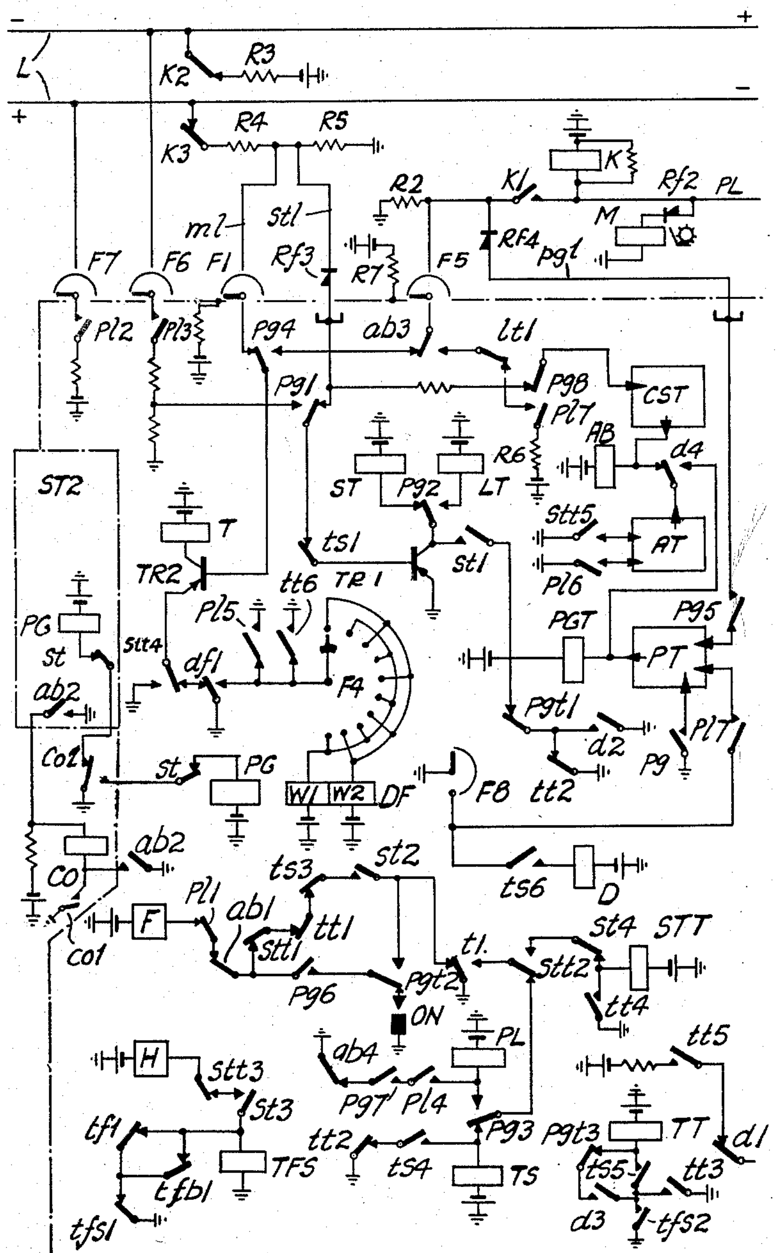

This invention relates to automatic telecommunication, especially telephone, systems. In its basic concept it is particularly concerned with the line circuits for such systems.

In certain automatic telephone exchange systems, lines incoming to an exchange from subscribers' stations or other exchanges are connected to a primary switching stage which may be either a line finding stage through which a number of lines are selectively given access to the subsequent switching mechanism by which connection towards a called line is established, or a selector hunting stage in which a selector hunter is provided individually for each line and gives it selective access to a number of selectors in the subsequent switching mechanism. In the latter case the appearance of a calling condition on a line, normally as a result of the establishment of a line loop on the line as when a subscriber lifts his receiver, causes the line's selector hunter to search for and stop at an outlet giving access to a free selector. In this case each line is connected to the wiper of its selector hunter, which normally is a rotary selector. In the case of line finders, which may also be rotary selectors, a calling condition applied to a line results in a line finder to which the line is connected being caused to search for and stop at the calling line, the lines being in this case connected to respective outlets, that is, bank contacts, of the line finders. The present invention is particularly applicable to and will be described mainly in connection with a line finder system, but it may also be applicable to other systems.

Each line has its own line circuit comprising an assemblage of components individually associated with the line and serving inter alia for controlling the initiation of a line finding or selector hunting action in response to a calling condition. Two basic kinds of line circuit are known. The most commonly used includes a line relay which is connected to the line so as to be energized on the establishment of a line loop on the line, and a cut-off relay which is operated to disconnect the line relay from the line when a primary switch to which the line is connected (line finder or selector hunter) has reached an appropriate outlet in response to a calling condition of the line, and also when a final selector reaches the line when the latter is being called. With the line relay thus able to be disconnected from the line it becomes possible to isolate the line for line testing, which in the case of an unattended exchange may then be effected remotely. Furthermore since the line circuit components are disconnected during a call they cannot interfere with it.

Although the line circuits are individually relatively small parts of the exchange, the number of these line circuits may be very large and any economy that can be achieved in their composition is therefore significant. With a view to economizing on line circuit equipment, relay-less line circuits have been proposed in which the conditions of a line, namely free, calling or engaged, have been indicated by potentials built up over resistors permanently connected to the line. The permanent connection of these resistors to the lines, especially in a public exchange, can be embarrassing in that inter alia isolation of a line circuit for testing purposes can no longer be achieved simply by the operation of a relay. Moreover the voltage source (battery) by which the potentials indicating the line conditions are produced, is permanently connected during the call the current fed from this source has therefore to be kept low and the length of the lines has consequently to be kept relatively short A facility often required is that in a so-called permanent-loop condition of a line an alarm should be given and/or the line should be locked out of service by rendering ineffectual the permanent calling condition then obtaining, and by preventing a final selector from setting to the line if it is being called. A permanent-loop condition may arise in the following circumstances:

(1) When a calling condition has appeared on a line but has not been followed within a reasonable time by the impulse trains which should be received over the line for the setting of the switching mechanism that has been seized for the expected call as a result of the calling condition;

(2) When at the end of a call the calling subscriber fails to replace his telephone;

(3) When at the end of a call the called subscriber does not replace his telephone and does not subsequently dial within a reasonable period.

In the first of these circumstances, which may arise as a result of a fault which simulates a calling condition or of a subscriber failing to dial after lifting his telephone, it is clearly undesirable that the seized switching mechanism should thus be rendered unavailable for use on calls from other lines and arrangements may therefore be provided by which in known manner the seized switching mechanism is automatically released at the end of a timed interval from the initial appearance of the calling condition. In the second of the enumerated circumstances, assuming that the switching mechanisms through which the call was established are held from the calling line (calling subscriber release), an alarm condition may be given, namely the so-called called-subscriber-held alarm, in response to which the seized switching mechanism would be forcibly released, usually manually. In the third circumstance, which again assumes calling subscriber release, the switching mechanisms would be released consequent on the replacement of the calling subscriber's telephone and the called subscriber's line would be left in a calling condition which would become a permanent loop condition if this latter subscriber does not then dial within a reasonable time.

Permanent-loop alarm and/or lock-out facilities can be provided in the case of line circuits having a line relay and a cut-off relay by the provision of a third relay working in conjunction with the other two to provide a "memory" of the fact that the loop condition of the line has already been answered, but this of course increases the number of line circuit components. With relay-less line circuits permanent-loop facilities cannot readily be provided in the line circuit because static storage devices capable of inhibiting the calling signal would tend because of their expense to outweigh the advanages otherwise obtainable with relay-less line circuits.

According to the present invention, a line circuit including resistances over which a calling condition on the line builds up a starting potential effective to bring about the setting of a primary switch (line finder or selector hunter) to which the line is connected, includes also a single, cut-off, relay which is connected to be operated in response to an operating condition extended thereto by a primary switch thus set, and which when operated disconnects said resistances from the line and establishes for itself a local holding circuit independent of the primary switch whereby the operating condition can be removed from the operated cut-off relay without consequent release thereof.

The cut-off relay, thus operated during the initial stages of the setting up of the call, would remain operated during the call as is usual and could be released at the end of the call by substituting for the operating condition initially extended to it over the primary switch a releasing condition which releases the relay, for instance by short-circuit. By arranging that when the line is in a permanent-loop condition any automatic or manual release of the switch mechanisms has the result of removing the operating condition without replacing it by the releasing condition, the cut-off relay will remain operated and will thus remember and indicate the existence of the permanent-loop condition. With the cut-off relay thus operated the resistances over which the starting potential was built up are disconnected from the line and the calling condition of the line is therefore ineffectual. Moreover the cut-off relay may be arranged to establish in these circumstances a lock-out condition preventing the line from being seized if called. For instance, in the usual arrangements by which a final selector searching for a called line tests the condition of the called line by presenting to a testing circuit the potential of the relevant test contact of a test arc of the selector, a contact of the operated cut-off relay may apply to that test contact, in the permanent-loop lock-out condition, a potential to which the final selector testing circuit cannot respond. This potential which will be referred to as a lock-out potential, would preferably be different from the "busy" potential, normally earth, at which the contact would be held to prevent seizure of the line if engaged in a call.

In order to provide for automatic restoration of a line to service following removal of a permanent-loop condition which effectively locked it out of service—for instance on subsequent replacement by a subscriber of his telephone—a restoration circuit may be provided which can search over a group of lines for one which is in the lock-out condition and on finding such a line can test it to determine whether or not the permanent-loop condition still exists, being effective to cause release of the operated cut-off relay of that line if the condition has been removed. In this restoration circuit the presence of a lock-out potential applied by the operated cut-off relay as already mentioned, may initiate after a suitable delay the operation of a line hunter which on reaching a line in the lock-out condition presents the lock-out potential to a testing circuit which responds thereto to stop the line hunter at the line: this line hunter may also present to the line a loop testing relay which permits the release of the cut-off relay if the permanent-loop condition of the line has been removed but prevents such release if the line is still in the permanent-loop condition.

The invention may be applied to a switching system which includes what will be termed a start circuit which serves a group of lines and responds to a calling condition on one or more of the lines by initiating operation of a line hunter which searches for and sets to (that is, becomes stopped at) a calling line and also by initiating an action which results in a primary switch becoming set to the calling line found by the line hunter. Thus in a register-controlled system the start circuit may also initiate operation of a register selector which selects a free register having access back to the calling line through a rank of line finders to which the lines are connected. The selected register can then receive information from the start circuit as to the identity of the calling line (this information being derived from the setting of the line hunter), and on the basis of this information can cause a line finder to set to the calling line to establish between it and the register a connection over which digit impulses received from the calling line and identifying a called line can pass to the register for use by the latter in attempting to set up the call in accordance with usual practice. Since the register knows the identity of the calling line the setting of the line finder to this line may be achieved under control of the register in a known manner, as may also be the setting of selectors giving access to the called line. In applying the invention to such a system the start circuit associated with a group of lines may be duplicated and each circuit may be made selectively capable of acting either as a start circuit responsive to a calling condition on a line as just indicated or as a restoration circuit responsive to a lock-out condition of a line in the manner indicated earlier, the same line hunter being used in searching for a calling line or a locked-out line as the case may be. The functions of the circuits may be automatically interchangeable.

Figure 2:
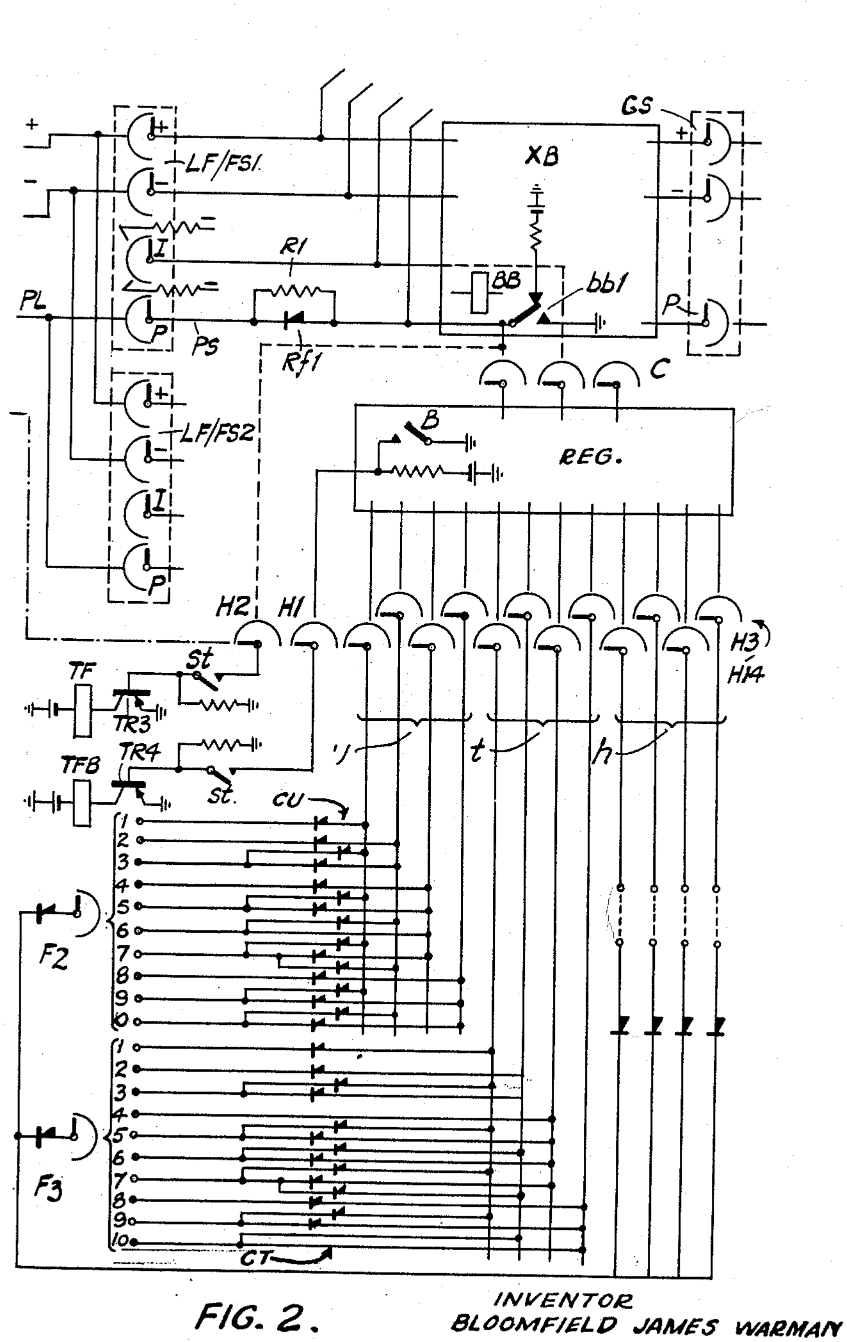

By way of example an automatic telephone exchange system embodying the invention and employing duplicate start circuits as just mentioned will now be described with reference to the accompanying drawing of which the two FIGS. 1 and 2 together constitute, when placed side-by-side with FIG. 2 to the right of FIG. 1, a single circuit diagram of the parts of such system pertinent to the embodiment of the invention therein. It is assumed that the switching system serves a plurality of subscribers' lines divided into a number of line groups each of which is served by duplicate, interchangeable start circuits of which only one is effective as a start circuit at any time. Each subscriber's line has its own line circuit, but for the sake of clarity only the line circuit of one line L has been shown in the drawing. Also, only one start circuit serving the line group containing the line L has been shown in detail: the duplicate start circuit serving this group is represented by the block ST2 in which is shown only those circuit elements which are directly associated with a change-over relay CO the function of which will be described later. Other parts of the system, such as registers and transmission bridges have only been indicated in block form in the drawing since they are of no direct concern to the invention and their essential details can readily be derived by one skilled in the art on the basis of known systems. There are a plurality of registers, one of which is represented by the block REG as typical of the others, and a plurality of transmission bridge circuits, typified by XB, to some or all of which each register such as REG has access over a selector switch C by which the register, on being seized for a call, takes into use for the call a suitable free transmission bridge. As regards the transmission bridge circuits to which each register has access, only some of them may have access to any particular line group.

Referring to the drawing each line such as L of a line group is multiplied over corresponding outlets of a group of primary switches, typified by LF/FS1 and LF/FS2, which are constituted by motor-driven rotary selectors used both for line finding in respect of calling lines and for final selection in respect of called lines. Each rotary selector switch such as LF/FS has four contact arcs, including two arcs + and − to which the line wires of the subscribers' lines L are respectively connected, and a test-, or P-, arc to which test-, or P-, wires such as PL individual to the respective subscribers' lines are connected, and from the wiper of which extends a test-, or P-, wire PS individual to the particular switch. The designations +, −, and P will be understood to correspond to the tip, ring and sleeve designations which are more common in American usage. Each switch also has a pulsing arc I from the wiper of which impulses are reverted for control purposes during the setting of the switch to a required calling or called line. The P-wire extending from the P-arc wiper of each switch such as LF/FS includes a half-wave rectifier R/1 shunted by a resistance R1. In accordance with usual practice this P-wire will be marked with earth potential to indicate a busy condition of the switch and of a line to which the switch is set.

The line circuit for each subscriber's line such as L includes a cut-off relay K connected between the relevant P-wire PL and an earthed negative battery. This relay K will therefore be operated between the negative battery and earth when one of the selector switches such as LF/FS1 is set to the line concerned and a busying earth potential has been applied to the P-wire PS of that switch, this earth potential being extended over the set switch to the line P-wire PL. The rectifier R*f*1 in the switch P-wire PS is poled to prevent feedback of a busying earth potential applied to the line P-wire PL over another primary switch such as LF/FS2 set to the line. A subscriber's meter M may be connected in series with a rectifier R*f*2 between the line P-wire PL and earth, so as to be operable by means of a positive pulse applied to the switch P-wire PS and extended to the meter M over the set switch, this positive pulse being passed by the rectifier R*f*1 in the switch P-wire PS but being unable because of its polarity to affect the cut-off relay K. The rectifier R*f*2 in series with the meter M prevents the cut-off relay K from being permanently operated through the meter M.

The cut-off relay K has a holding contact *k*1 connected between the line P-wire PL and an earthed resistance R2, closure of this contact *k*1 on operation of the relay K being therefore effective to close through this resistance R2 a local holding circuit which is independent of the primary switches LF/FS. The line circuit of each line L also includes a resistance R3 which is connected between one line wire and earthed negative battery through a first normally-closed contact *k*2 of the cut-off relay K, and two further, serially-connected, resistances R4 and R5 connected between the other line wire and earth through a second normally-closed contact *k*3 of the relay K. From the junction of the resistances R4 and R5 extends a start lead *stl* and a marking lead *ml* on both of which appears, when the subscriber loops his line L to call, a calling potential built up across the resistances R3, R4, R5 via the contacts *k*2 and *k*3 and the line loop.

The starting leads such as *stl* from the line circuits of each line group include respective isolating rectifiers R*f*3 and are commoned into both of the duplicate start circuits serving that line group. Each start circuit includes, for normal operation, the following components:

A start relay ST which responds, preferably through a transistor TR1, to a calling potential received on one or more of the commoned start leads from the line group served by the start circuit;

A motor-driven rotary selector switch F with contact arcs F1, F2, F3, . . . constituting a line hunter which is initiated into operation on operation of the start relay and at a testing arc F1 thereof searches over the marking leads *ml* for one marked by a calling potential;

A line testing relay T to which the line hunter testing arc F1 presents the marking leads *ml* in turn, preferably through a transistor TR2, and which in response to a calling potential on one of these leads *ml* operates to stop the line hunter F at the outlet corresponding to the calling line thus indicated;

An auxiliary line testing relay TS which is operated consequent on operation of the line testing relay T;

A further motor-driven rotary selector switch H with contact arcs H1, H2, H3, . . . constituting a register selector which is initiated into operation on operation of the start relay ST and of which one testing arc H1 tests for a free register while another testing arc H2 (provided in the event that of the transmission bridge circuits to which each register has access, only some have access back to the calling line group) tests for free transmission bridge circuits having such access;

A transmission bridge testing relay TF which, being provided only if the testing arc H2 is present for the purpose indicated, responds, preferably through a transistor such as TR3, when the arc H2 finds a free transmission bridge circuit having access back to the calling line group;

A register testing relay TFB which operates, preferably via a transistor such as TR4, to stop the register selector when it finds a free register, provided that the transmission bridge testing relay TF, if provided, also responds to indicate that this register has access to a free transmission bridge circuit having access back to the calling line group;

An auxiliary register testing relay TFS which is operated consequent on operation of the register testing relay TFB together with operation of the transmission bridge testing relay TF if provided;

A slow-operating relay TT which is operated consequent on combined operation of the auxiliary line and register testing relays TS and TFS; and An auxiliary start relay STT which is operated consequent on operation of the slow-operating relay TT.

With regard to the contact arc H1 of the register selector H, each register, when free, applies to a corresponding bank contact of the arc H1 a free marking potential which, being derived for instance from negative battery over resistor R6, can be removed, when the register becomes busy, by operation for instance of a contact B which applies a busy earth potential to the arc contact concerned. The marking of the bank contacts of arc H2 according as the pertinent transmission bridge circuits are free or busy has been indicated only by a dotted line connection from the bridge circuit XB to the arc H2 and can in practice be effected in any convenient manner.

Other components included in the start circuits, in addition to those already mentioned, will be referred to later in connection with the particular functions they serve.

Only one of the start circuits is effective for normal operation, which takes place in the manner now to be described. In the following description the convention is employed that relays are denoted by capital reference letters and their contacts are given corresponding small letters: thus it will be understood that contacts *ts*1, say, belong to relay TS without this fact having to be specifically mentioned. Where relay contacts are referred to, before the relays themselves have been mentioned, it is to be understood that these relays play no part in the part of the operation then being described and will be considered at a later stage.

The cut-off relay K of subscriber's line L is normally unoperated so that its contacts *k*2 and *k*3 in series with the resistances R3, R4, R5 connected to the line are closed. When the subscriber lifts his telephone and thereby loops the line L, current flows through the resistances R3, R4, R5 via the line loop and establishes a calling potential on the start lead *stl* and marker lead *ml*. In response to this calling potential on the start lead *stl*, the start relay ST in the effective start circuit operates over contacts *pg*1 and *ts*1 (both unoperated) and locks over contacts *pg*2 unoperated, *st*1 operated and *pgt*1 and *ts*2 unoperated. The line hunter F is thereupon energized over contacts *pl*1, *ab*1, *stt*1, *tt*1, and *ts*3, all unoperated, *st*2 operated and *t*1 unoperated. The line hunter F therefore begins to search for a calling line. When it reaches a calling line, the line testing relay T operates in response to the calling potential on the marker lead *ml* and arrests the drive of the line hunter F by operating contact *t*1 in its energizing circuit. Operation of *t*1 also causes operation of the auxiliary line testing relay TS over contacts *t*1 operated and *stt*2 and *pg*3 unoperated. A temporary locking circuit is established for relay TS over contacts *ts*4 and *tt*2. The operation of relay TS releases the start relay ST at contact *ts*2 and disconnects it at contact *ts*1 from the start leads *stl*. Meanwhile the operation of the start relay ST has also initiated operation of the register selector H by establishing an energizing circuit for it over contacts *stt*3 unoperated, *st*3 operated, *tf*1 or *tfb*1 unoperated and *tfs* unoperated. When the register selector reaches a free register capable of handling the call, the register testing relay TFB and the transmission bridge testing relay TF, if provided, both respond and stop the register selector H by opening its energizing circuit at contacts *tf1* and *tfb1*. The auxiliary register testing relay TFS then operates in series with the register selector, the current received by the latter in this series connection being insufficient to restart it.

The auxiliary line and register testing relays TS and TFS being now operated, the slow-operating relay TT also operates over contacts *ts5* and *tfs2*, after its lag, and locks over contacts *ts5* and its own contacts *tt3*. The operation of the slow-operating relay TT in turn operates the auxiliary start relay STT over contact *tt4*. Relay STT establishes a locking circuit for itself through contacts *st4* unoperated and *stt2* and *t1* operated. The operation of the auxiliary start relay STT brings about the release of the auxiliary line testing relay TS at contacts *stt2* (the temporary holding circuit for TS being now broken at *tt2*) and also the release of the auxiliary register testing relay TFS at contacts *stt3*. Release of TS brings about at contacts *ts5* the release of the slow-operating relay TT after its release lag.

The position to which the line hunter F has been set corresponds to at least part of the numerical identity of the calling line, for instance the tens and units digits of this number. During the operated period of the slow-operating relay TT, its operated contacts *tt5* cause a combination of markings to be applied to each of two groups of marking leads *t* and *u* from arcs F2 and F3 respectively of the line hunter F, these markings, which depend on the setting of the line hunter F, represent the tens and units digits of the calling line and are passed to the seized register over arcs H7–H14 of the register selector H. The markings are preferably coded, for instance by binary coding rectifier networks CT and CU as shown in order to reduce the number of register selector arcs required. Other marking combinations, determined for instance in dependence on the particular start circuit concerned by means of a strapping field SF, may also be passed over other arcs H3–H6 of the register selector H as an identification of a further part, for instance the hundreds digit, of the calling line's identity.

The register stores the identity of the calling subscriber as thus received and subsequently, in known manner, controls the setting of one of the primary switches, say LF/FS1, to the calling line, doing so under revertive impulse control (that is, by counting impulses reverted to it from the primary switch as the latter is rotated towards its outlet to which the calling line is connected) in accordance with the stored identity of the calling line. When the switch LF/FS1 is set, a busying earth applied to its P-wire PS in a manner not shown brings about operation of the cut-off relay K as already explained: the busying earth potential may be applied for instance by operation of contacts *bb1* of a holding relay BB in the transmission bridge circuit XB, this holding relay being operated in known manner in consequence of the line loop being extended to the transmission bridge over the + and — arcs of the set switch LF/FS1. The operated cut-off relay L locks over contacts *k1* in its local holding circuit and disconnects the resistances from the calling line at contacts *k2* and *k3*, thus removing the calling potential from the start lead *stl* and marking lead *ml* of that line. When a primary switch has thus been set to the calling line the register then sends dialling tone to the line, receives and stores digit impulse trains from the line, and thereafter proceeds to set up the call towards a called line by controlling the setting of selectors by revertive impulse in accordance with the identity of the called line, these functions being carried out in a known manner which is no concern of the present invention. By way of example the transmission bridge circuit XB has been schematically shown as having access on its outgoing side to a group of selectors GS which in turn affords access to the line finder/final selection stage in respect of local calls.

Reverting to the actions taking place in the start circuit, on operation of the line testing relay T through its transistor TR2 the conduction of this transistor produces a shunting effect on the calling potential on the starting lead *stl* and thereby effectively removes this potential. During the time that the auxiliary line testing relay TS is operated, as has already been described, it disconnects the start relay ST from the commoned start leads *stl* at contacts *ts1* and also breaks the holding circuit for the start relay, at *ts2*, so that this latter relay releases. When relay TS is subsequently released on operation of relay STT, it re-connects the start relay ST to the start lead *stl* at contacts *t1* and if a calling potential from another line in the same group is present the start relay ST will re-operate preparatory to initiating a new operation in respect of this other calling line, this new operation being started only after the slow-operating relay TT has released as previously described and the auxiliary start relay STT has been released by the opening of contacts *tt4* in its operating circuit and contacts *st4* in its holding circuit. Untill relays TT and STT are released, the energizing circuit of the line hunter F is interrupted at contacts *stt1* and *tt1*, and that of the register selector H at contacts *stt3*. As will be appreciated, the register seized for the original call has by this time received and registered the identity of the original calling line, so that the start circuit is now free to deal with another call in the same manner as before.

In starting a new operation in response to a calling potential from another line, the line testing relay T should in some way be initially released in order to ensure that the line hunter F does not immediately re-test to the original calling line if the cut-off relay K has not by this time operated to remove the calling potential from the marking lead *ml* of this latter line. The line testing relay T should, however, be immediately again rendered operable whenever the line hunter F leaves the outlet on which it was standing, in order to allow it to set to the next outlet if this outlet should correspond to another calling line. To achieve this operation, a differential relay DF is provided having one winding *w1* connected to alternate contacts of an arc F4 of the line hunter F and another, differential, winding *w2* connected to the remaining contacts of this arc F4. The arc F4 has a bridging wiper to which earth potential can be applied by operation of contacts *tt6* of the slow-operating relay TT and also by operation of holding contacts *df1* of the differential relay DF. When the differential relay DF is operated it breaks an energizing path for the line testing relay T at contacts *df1*, but an alternative energizing path for this relay is established over contacts *stt4* so long as the auxiliary start relay is operated. As has already been described, the auxiliary start relay STT is released (after release of the slow-operating relay TT) in the presence of a calling condition which opeartes the start relay ST and therefore prevents the auxiliary start relay from locking at contacts *st4*: the alternative energizing path for the line testing relay T via contacts *stt4* operated is therefore then broken. The differential relay is operated on one of its windings *w1* or *w2*, and locks on this winding over contacts *df1*, in the operated period of the slow-operating relay TT (contacts *tt6* closed). This disconnects the other energizing path of the line testing relay T at contacts *df1*, so that this relay cannot respond to the calling potential on the marking lead *ml* of the original calling line if this potential is still present. When a new operation of the line hunter F commences and it leaves the outlet on which it was standing, the differential relay DF is differentially released by the simultaneous energization of its two windings *w1* and *w2* occurring while the bridging wiper of the arc F4 is bridging adjacent contacts of the arc. This release of the differential relay DF re-connects the line testing relay T at contacts *df1*, so that normal testing can take place at the next outlet of the line hunter F if required.

As already explained, when a primary switch such as LF/FS1 has been set to a calling line, a busying earth potential applied to the P-wire PS of that switch causes operation of the line's cut-off relay K. The cut-off relay K locks over contact *k*1 in its local holding circuit and by opening its contacts *k*2 and *k*3 removes the calling potential from the start lead *stl* and marker lead *ml*. The removal of the calling potential from the marker lead *ml* results in release of the line testing relay T if this has not already taken place as a result of the action of the differential relay DF. When the calling subscriber restores his telephone on completion of his call, the earth potential on the P-wire PS of the primary switch LF/FS1 is replaced by a negative potential applied for instance by the release in the transmission bridge involved of tht holding relay BB which originally applied the busy earth potential. The resistance R1 shunting the rectifier R*f*1 in the P-wire PS permits this negative potential to release the cut-off relay K of the calling line L.

If a subscriber initiates a call on line L by lifting his telephone, but then fails to dial, a register will be seized by the start circuit in the manner already described and will set a primary switch such as LF/FS1 to the calling line as before. As is common practice, on failure of setting impulses to arrive within a certain time, the register will thereupon release itself and clear down the seized switching mechanisms, including the primary switch LF/FS1. With this switch LF/FS1 no longer set to the calling line, the potential then appearing on the line's P-wire PL will be that at the junction between the cut-off relay K and the resistance R2 in its holding circuit through contacts *k*1. This last potential is made insufficient to allow a final selector to test into the line L, which cannot be rung while the line loop exists. The operated cut-off relay K also maintains the resistances R3, R4, R5 disconnected from the line at contacts *k*2, *k*3, so that the line loop is is ineffective to produce a calling potential on the start lead *stl* to the start circuit. The line circuit is therefore now in a permanent-loop lock-out condition.

Since another primary switch such as LF/FS2 (remembering the dual function of these switches for line finding and final selection) could test into the calling line as a final selector until the busying earth potential is applied to the line's P-wire on setting of the switch LF/FS1 to the line, immediate busying may be provided if required by causing the register controlling such other switch to test for a loop on the line L after testing to its non-busy P-wire condition and to react to the presence of such loop in the same manner as it would do to a busy earth on the P-wire. Such testing would not result in the calling subscriber hearing unpleasant clicks during conversation because it can only take place immediately after the telephone is lifted, before the dialling tone is given.

Since the resistors R3, R4, R5 connected to a subscriber's line are disconnected by the cut-off relay K during speech, they can be of very low value, for instance 200 ohms, and it becomes possible to ensure that, even on relatively long lines, calling conditions can be established which can be easily identified in the circuit, particularly where the latter includes the transistor TR1 and TR2 as previously indicated. Calling can therefore be accomplished over longer lines than is possible with existing line circuits and this has particular advantage for systems now being developed employing equipment of increased sensitivity capable of serving such longer lines.

The start circuits may include arrangements whereby after the effective start circuit has set its line hunter F to a calling line, the line hunter F remains set to that line in the absence of any calling potential on the starting leat *stl* from another calling line in the same group and awaits the operation of the cut-off relay K to indicate the arrival at the calling line of a primary switch such as LF/FS1 sent round by a register. If the cut-off relay K fails to be operated within a certain time, the start circuit may operate an alarm and/or take some other appropriate action. In the present instance the effective start circuit is arranged, on failure of the cut-off relay K to be operated within a given time, to assume a standby function and to render the dupulicate start circuit, which was previously acting as standby, effective to make a second attempt to set up the call in the same manner as already described. To this end the following provisions may be made ineach of the duplicate start circuits.

As already described the auxiliary start relay STT, having been operated by the slow-operating relay TT following setting of the line hunter F and register selector H, locks in its operated condition over contacts *st*4 unoperated and *stt*2 and *t*1 operated if no calling potential for another line is present to operate the start relay. When operated, the auxiliary start relay STT initiates at contacts *stt*5 the operation of a timing device AT of any suitable form which, at the end of a timed interval within which the cut-off relay K should have been operated, operates a change-over relay AB over contact *d*4 (unoperated) if the timing action has not been stopped in the meantime by release of relay STT consequent upon release of the line testing relay T. This changeover relay AB in turn reverses, by operating its contacts *ab*2, the condition of at ransfer relay CO which is common to both of the duplicate start circuits. The relay CO thereupon transfers to the circuit which was acting as standby, the function of dealing with calling lines. For this purpose the transfer relay CO is arranged so as at any time to be either in a released condition or locked over its contacts *co*1 in an operated condition: the change-over relay contacts *ab*2 in the start circuit illustrated in detail operate to close an energising circuit for the transfer relay to operate it if already in its released condition while the change-over relay contacts *ab*2 in the duplicate start circuit ST2 operate to release it by short circuit if previously operated. Operation of the change-over relay in a start circuit may also initiate an alarm. The transfer relay CO controls the operation of function-determining relays PG in the two start circuits in dependence on whether or not the transfer relay CO is itself operated: thus the relay PG in the fully illustrated start circuit is operated over contacts *co*2 only if relay CO is operated, whereas relay PG in the start circuit ST2 is operated over contacts *co*2 when relay CO is unoperated. Start relay contacts *st*5 ensure that the PG relay of a start circuit cannot be operated if the start circuit is already dealing with a call. In the start circuit in which the PG relay is operated, the start relay ST is disconnected at contacts *pg*1 from the starting leads *stl*, so that this circuit acts as the stand-by circuit and only the other start circuit is effective to deal with a call.

As has already been indicated the stand-by start circuit may also act as a restoration circuit which can search over the associated group of lines for one which is in the lock-out condition and on finding such line can test it to determine whether or not the permanent-loop condition still exists, this restoration circuit being effective to cause release of the operated cut-off relay K of that line if the condition is found to have been removed. To this end, in the operated condition of the function-determining relay PG in the stand-by circuit, the line testing relay T is re-connected at contacts *pg*4 so that it can test over an arc F5 of the start circuit's line hunter F, via contacts *ab*3 unoperated, the potentials at the junctions between the cut-off relays K and their series rseistances R2 in the respective line circuits. Morevoer, these junction points are connected over isolating rectifiers such as R*f*4 to another common start lead *pgl* which is extended over operated contacts *pg*5 to a second timing device PT in the start circuit. The normal connection of the start leads *stl* to the start relay ST is broken at contacts *pg*1 and *pg*2 and instead these contacts connect a loop testing relay LT to test the potential at a point A whose potential depends on the looped or un-looped condition of the lines as they are presented in turn to the stand-by circuit over further arcs F6 and F7 of the line hunter F. The lines are presented for this purpose through contacts pl2 and pl3 of a slow-release, auxiliary relay PL which is now connected by contacts pg3 in place of the auxiliary line testing relay TS.

If a permanent-loop condition exists on any line such as L, the lock-out potential appearing at the junction between its cut-off relay K and the series resistance R2 is fed over lead pg1 to the timing device PT which, after a certain interval timed thereby, operates an alternative start relay PGT to establish for the line hunter F an energising circuit extending over contacts pl1 and ab1 unoperated, pg6 and pgt2 operated, and t1 unoperated. The register selector H plays no part in the operation now being described. The line hunter F tests the lines in turn, at arc F5, for one presenting a lock-out potential at the junction of relay K and resistance R2 as a result of a permanent-loop condition. When the line hunter F meets a lock-out potential, the line testing relay T operates and arrests the drive of the line hunter at contacts t1. It also brings about over contacts t1 the operation of the auxiliary relay PL which locks over contacts pl4, pg7 and ab4 and presents to the loop testing relay LT over contacts pl2, pl3, pg1, ts1 and pg2 the line on which the line hunter F is not standing. It also brings about operation of the differential relay DF, with consequent release of the line testing relay T at contacts df1, by applying earth potential at contacts pl5 to the wiper of the line hunter arc F4. The auxiliary relay PL also initiates at contacts pl6 the operation of the timing device AT, which, after its timing period, operates the relay AB this time to initiate at contacts ab4 the slow release of relay PL. In this circumstance the operation of the change-over relay AB connot result in reversal of the transfer relay CO as it only tends to set the transfer relay to its existing condition. As an alternative, a separate timing device and relay controlled thereby could be employed for the purpose just described, but it will be assumed that the timing device AT and the change-over relay AB are employed as illustrated.

If the loop testing relay LT remains unoperated, thereby indicating that the line then being tested is no longer looped, then with the auxiliary relay PL operated the subsequent operation of the change-over relay AB has the result that a negative restoring potential, derived from negative battery over resistance R6, is applied over contacts pl7, lt1 and ab3 via arc F5, to the junction between the lines cut-off relay K and its series resistance R2. This restoring potential releases the cut-off relay K by a virtual short-circuit and thus restores the line circuit to normal. If, on the other hand, the loop testing relay L is operated because the line loop still exists, it prevents this negative restoring potential from being applied.

The release of the auxiliary relay PL after its release lag brings about the release of the change-over relay AB by opening contacts pl6. If a lock-out condition then exists in another line circuit, so that the relay PGT operated by the timing device PT remains operated, the line hunter F is again driven in search of such line circuit. The differential relay DF acts as before to prevent the re-started line hunter F from immediately testing into the outlet on which it was standing.

The last contact of the line hunter arc F5 over which the testing relay T tests for the lock-out potentials of locked-out line circuits is shown connected to negative battery through a resistance R7 so as to have applied to it a simulated lock-out condition which causes the line hunting action for locked-out lines to be stopped at this last outlet. When the auxiliary relay PL then operates in the manner already described, it applies over its contact pl7, from the last contact of yet another arc F8 on the line hunter F, a potential (earth) which resets the timing device PT and brings about restoration of the relay PGT. The release of this relay PGT causes the line hunter F to be restored to its normal or home contact under control of an off-normal contact ON in an energising circuit then established for the line hunter F over contacts pl1, ab1, pg6 and pgt2. Search for locked-out lines can then recommence if the existence of such a line is indicated by the presence of a lock-out potential on the start lead pgl to the timing device PT.

Reverting to the normal operation of a start circuit in dealing with calling lines (relay PG unoperated), if a further calling potential exists afters the start circuit has dealt with one calling line, thus indicating the presence of another calling line, the resulting operation of the start relay ST prevents the auxiliary start relay STT from locking. This relay therefore releases on release of the slow-operating relay TT and the start circuit register selector H will then search for and seize a register to deal with this second calling line. If the register dealing with the first call has not by this time completed the setting of a primary switch such as LF/LS1 with resultant operation of the cut-off relay K of the first calling line, then the calling potential from that line circuit will still be present and may in like manner start yet another search by the register selector H. There is no way in which the start circuit can know that a register has already been allocated to this first call and it may therefore seize a second register for it. It would be possible to provide each register with means for determining that it is the only one connected to a line before establishing a call from it. However, the seizure of more than one register for the same call represents undesirable false register traffic and to avoid this the following arrangement may be provided.

The line hunter F has the home contact of its test arc F1 connected to negative battery via resistance R8 so as to have applied to it a simulated calling potential to which the line testing relay T responds, thereby stopping the line hunter F in its home position. The line hunter F is then caused to remain in its home position for a timed period sufficient to allow a register to set a primary switch to a calling line being dealt with and to bring about operation of the relevant cut-off relay K. It would therefore be impossible for the line hunter F to arrive back at a calling line to which the start circuit has already attended before the cut-off relay K for that line should have been operated. For this purpose the operation of the auxiliary line testing relay TS in the normal manner consequent upon the operation of the line testing relay T when the line hunter F reaches its home position, is arranged by its contacts ts6 to cause operation of a relay D which at its contacts d1 prevents transmission of identity markings to the selected register, at its contacts d2 establishes an alternative holding circuit for the start relay ST independently of the auxiliary line testing relay TS, at its contacts d3 establishes an alternative holding circuit for relay TT dependent on contacts pgt3 remaining unoperated, at its contacts d4 disconnects the change-over relay AB form the timing device AT in order to prevent operation of this relay AB and consequent change-over to the stand-by condition. The relay PGT is connected by contacts d4 to the timing device AT, which starts a timing action on operation of the auxiliary start relay STT following operation of relay TT. The operated condition of relay STT prevents, at its contacts stt1, the re-energization of the line hunter F at this time. After the measured time interval the relay PGT is operated and interrupts at contacts pgt1 and pgt3 the holding circuits for the relays ST and TT respectively. The consequent release of relay TT causes the release of the auxiliary start relay STT. If the calling condition which initiated the drive of the line hunter is still present, the line hunter F starts searching again for the calling line. The testing relay T is prevented from testing back into the home outlet by means of the differential relay DF functioning in the manner previously described.

Since the start relay ST is locked by the unoperated condition of the auxiliary line testing relay TS during a searching action by the line hunter F for a calling line, random clearance by a calling subscriber will not cause random stopping of the line hunter F by release of the start relay ST. This could result in the possibility of a continuous reach if the subscriber should clear. However, in the arrangement just described for stopping the line hunter F in its home position, the interruption of the start relay's holding circuit at contacts *pgt*1 while the line hunter is in that position requires the presence of a calling potential to operate the start relay ST before the drive of the line hunter can be continued. The presence of a calling potential to operate the start relay ST is therefore checked before the line hunter is re-started.

As an alternative to the foregoing arrangement by which the line hunter is stopped for a determined period in its home position, the home contact of its testing arc F1 may be marked with a simulated calling condition resulting in a normal operation by which a register is selected and causes a primary switch to hunt round to a dummy line. This would give the required timing delay and would also afford a useful check that the various circuits involved were operating satisfactorily.

If calling potentials are received from two lines simultaneously, the effective start circuit deals with them in turn without waiting to check that the cut-off relays K of the calling lines are subsequently operated. If a fault exists which results in neither cut-off relay being so operated, the calling potentials remain on the start and marker leads *stl* and *ml* and the line hunter F will be sent continuously between the two calling lines, without any alarm being given. This may be avoided in a number of ways. For instance a counter may be provided in the start circuit to arrange for a check after every so many starts, or a timed pulse could cause the start circuit to test for the operation of a cut-off relay on the next operation after receipt of the pulse. Alternatively a timing element may be provided to detect the presence on the start lead *stl* of a continuous start signal exceeding some defined period beyond the probability of normal operation, this last arrangement being preferred because the continuous start condition can also be made to give an alarm and effect change-over to the stand-by circuit. To this end, the commoned start leads *stl* from the line circuits have been shown as being connected, over contacts *pg*8 unoperated, to a continuous start timer CST which measures the length of time for which a calling potential is present and, if it exceeds some given period, operates the changeover relay AB with the resultant action already described. In the stand-by circuit timer CST does not operate because of the operated condition of contacts *pg*8 in the stand-by circuit.

What I claim is:

1. An automatic telecommunication switching system including a primary switching stage, a plurality of line circuits for respective lines connected to the primary switching stage, resistances in each of said line circuits connected to present a starting potential in response to a calling condition of the pertinent line, means responsive to such starting potential for initiating setting of a switch of said primary stage appropriately to the particular calling line, and a single cut-off relay in each line circuit, said relay connected for operation in response to an operating condition extended thereto over a primary switch set as aforesaid and having contacts connected for disconnecting said resistances on operation of the relay and further contacts connected for establishing on operation of the relay a local holding circuit therefor independent of the set primary switch, thereby permitting removal of said operating condition from the operated cut-off relay without consequent release thereof.

2. A switching system as claimed in claim 1 including means effective on termination of a call to extend to the cut-off relay over the set primary switch, instead of said operating condition, a releasing condition effective to release the cut-off relay.

3. A switching system as claimed in claim 1, including in said primary switching stage a group of selector switches each capable of serving both for line finding and for final selection and each including a contact arc which constitutes a line testing arc in respect of final selection and which has a wiper with means for applying to it one or other of two potentials according as the switch is free or busy, each line circuit having an individual test wire multipled to said contact arc in the several selector switches of said group and the cut-off relay of the line circuit being connected between said individual test wire, and a source of potential different from said potential applied to the wiper of a switch when busy whereby this busy potential constitutes an operating condition for the cut-off relay of the line to which such switch is set, the cut-off relay having a local holding circuit comprising a resistance and normally-open contacts of the cut-off relay connected in series between the individual test wire and a point having a holding potential, which resistance in conjunction with the cut-off relay, when connected in series therewith by closure of said contacts, produces on the test wire a lock-out potential preventing final selection of the pertinent line.

4. A switching system as claimed in claim 1 including selector switches capable of serving as final selectors for lines connected to them and each having a line testing contact arc including a contact for each severed line, and wherein the cut-off relay in the line circuit of each line has contacts which are operated by the relay in a permanent-loop condition of the line and are connected for applying to the line's own contacts in the testing arcs of said final selector switches a lock-out potential preventing such final selector switch from seizing the line.

5. A switching system as claimed in claim 4, including a restoration circuit having means for searching over a plurality of said line circuit in search of one in which said lock-out potential has been established by sustained operation of the cut-off relay in a permanent-loop of the pertinent line, and means effective when such line circuit is found for testing the relevant line and applying a releasing condition to the line's cut-off relay if the permanent-loop condition is no longer present.

6. A switching system as claimed in claim 4, including a restoration circuit comprising a line hunter operable to search over a plurality of said line circuits, means for initiating such operation of the line hunter in response to the presence of said lock-out potential at any one of said plurality of line circuits, a testing circuit responsive to the presence of said lock-out potential at a line circuit reached by the line hunter in its search, said testing circuit stopping the line hunter thereat, at loop testing circuit presented by the line hunter to the line associated with the line circuit at which it has been stopped, and means governed by said loop testing circuit for releasing the cut-off relay in the line circuit if a permanent-loop condition of the tested line no longer exists.

7. A switching system as claimed in claim 6, including selector switches serving at least a line finding function in said primary switching stage, and duplicate start circuits serving said plurality of line circuits, each of said start circuits including a line hunter separate from said line finder selector switches and operable to search for and set to a calling line, and start means capable of being rendered responsive to a starting potential presented by a line circuit in said plurality, said start means on so responding initiating operation of the line hunter to set to a calling line and also initiating setting of a line finding switch in the primary switching stage to the same calling line in dependance on the setting of the line hunter, there being also function-determining means for rendering responsive to a presented starting potential at the start means in only one of the duplicate start circuits said function-determining means rendering the line hunter in the other start circuit effective as said line hunter of the restoration circuit.

8. A switching system as claimed in claim 7, wherein each start circuit includes a continuous start timing device and means responsive to a presented starting potential, in the start circuit rendered responsive to such potential, for initiating said timing device into a timing action for the duration of the presence of such starting potential, said timing device being effective, if its timing action is not interrupted within a certain time consequent upon the removal of all startng potentials presented to its start circuit, to initiate a change-over action on the function-determining means for the duplicate start circuits.

9. A switching system as claimed in claim 7, wherein the line hunter in each start circuit is a selector switch having a first contact arc in which each contact corresponds to a particular line and is connected to be marked in the calling condition of that line, and another contact arc having corresponding contacts each connected to be marked by the lock-out potential in a lock-out condition of the line to which it relates, and wherein each start circuit includes a start relay capable of being rendered responsive to a presented starting potential, an alternative start relay capable of being rendered responsive to a presented lock-out potential, said relays being each effective on so responding to initiate operation of said line hunter, a line testing relay operable to stop the line hunter, and a function-determining relay having an operated condition and a released condition, this last relay being effective in one said condition to render the start relay responsive to a presented starting potential and to connect the line testing relay to said first arc of the line hunter whereby to render it responsive to calling condition markings thereat, and being effective in the other condition to render the alternative start relay responsive to a presented lock-out potential, and to connect the line testing relay to said other arc of the line hunter whereby to render it responsive to lock-out markings at that arc.

10. A switching system as claimed in claim 7, including in each start circuit means operable in response to the line hunter reaching a home position thereof in a search for a calling line to inhibit further operation of the line hunter and a timing device initiated into operation by the last mentioned means and effective after a timed interval to cause restoration of said means and thereby again permit operation of the line hunter.

11. A switching system as claimed in claim 7, wherein each start circuit includes a timing device which is connected to be initiated into a timing action consequent upon its start circuit's line hunter becoming set to a calling line and means for interrupting said timing action in response to subsequent operation of that line's cut-off relay, the timing device being effective, if its timing action has not been interrupted within a certain time, to initiate a changeover action on the function-determining means for the duplicate start circuits.

References Cited by the Examiner

UNITED STATES PATENTS

| | | | |
|---|---|---|---|
| 2,401,352 | 6/46 | Hersey | 179—17 |
| 2,615,094 | 10/52 | Mitchell | 179—17 |
| 2,695,928 | 11/54 | Joel | 179—17 |
| 2,731,514 | 1/56 | Oberman | 179—18 |
| 2,794,859 | 6/57 | Abbott | 179—17 |
| 2,820,100 | 1/58 | Abbott | 179—17 |
| 2,901,544 | 8/59 | Collins | 179—17 |
| 2,959,642 | 11/60 | Dubuar | 179—18 |
| 3,025,356 | 3/62 | Ko Muroga | 179—18 |

ROBERT H. ROSE, *Primary Examiner.*

L. MILLER ANDRUS, WALTER L. LYNDE, *Examiner.*